(12) United States Patent
Spielberg (10) Patent No.: US 8,466,984 B2
(45) Date of Patent: Jun. 18, 2013

(54) CALIBRATING COLOR FOR AN IMAGE (75) Inventor: Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/796,797

(22) Filed: Jun. 9, 2010

(65) Prior Publication Data

US 2011/0304744 A1 Dec. 15, 2011

(51) Int. Cl.
H04N 9/73 (2006.01)

(52) U.S. Cl.
USPC .................. 348/223.1; 348/224.1; 348/229.1; 348/362

(58) Field of Classification Search
USPC ................ 348/222.1, 241, 243, 223.1–229.1, 348/362
See application file for complete search history.

(56) References Cited

U.S. PATENT DOCUMENTS

| 6,081,076 | A | 6/2000 | Ogawa | 315/241 |
|---|---|---|---|---|
| 6,379,022 | B1 | 4/2002 | Amerson et al. | 362/231 |
| 7,550,251 | B2 | 6/2009 | McLean et al. | 430/300 |
| 2004/0051796 | A1* | 3/2004 | Kelly et al. | 348/243 |
| 2006/0182436 | A1 | 8/2006 | Tabuchi et al. | |
| 2007/0085911 | A1* | 4/2007 | Nakamura | 348/223.1 |
| 2007/0098261 | A1 | 5/2007 | Kojima et al. | |
| 2007/0260985 | A1 | 11/2007 | Utagawa et al. | |
| 2008/0043133 | A1 | 2/2008 | Sasaki et al. | |
| 2008/0043150 | A1 | 2/2008 | Bellis, II et al. | |
| 2009/0231468 | A1 | 9/2009 | Yasuda | 348/234 |
| 2009/0285573 | A1 | 11/2009 | Aoyagi | 396/157 |
| 2010/0103310 | A1 | 4/2010 | Lin et al. | 348/366 |
| 2010/0124041 | A1 | 5/2010 | Druchinin | 362/16 |
| 2010/0189429 | A1 | 7/2010 | Butterworth | 396/155 |
| 2010/0254692 | A1 | 10/2010 | Kurt et al. | 396/155 |
| 2010/0302447 | A1 | 12/2010 | Shirai | 348/607 |

FOREIGN PATENT DOCUMENTS

| JP | 2003324755 A | 11/2003 |
|---|---|---|
| JP | 2005277957 A | 10/2005 |
| JP | 2007129622 A | 5/2007 |
| WO | WO2009108050 A1 | 9/2009 |

OTHER PUBLICATIONS

Borman, S.-et al.; "Image Sequence Processing"; Dept of Electrical Engineering; University of Notre Dame; Oct. 14, 2002, 81 pages.

(Continued)

Primary Examiner — Yogesh Aggarwal
(74) Attorney, Agent, or Firm — VanLeeuwen & VanLeeuwen; Steven L. Bennett (57) ABSTRACT Calibrating color (such as adjusting color balance) for an image may include capturing a set of calibration images of a calibration target. The calibration target includes at least one color reference region illuminated by a light source having a distribution of frequencies that cycles over a fixed time period. The calibration images are captured over a calibration period that is greater than or equal to the fixed time period over which the distribution of frequencies cycles. Each of the calibration images is associated to a time identifier. A color balance adjustment is calculated for each of the calibration images, for forming a time-dependent color spectrum model of the color balance adjustments. The color spectrum model models changes in the light source over the fixed time period. In one embodiment, a subject image of a subject is captured for a determined exposure time. In the subject image, the subject is illuminated by the light source. Exposure time data is associated to the subject image. At least one subject color balance adjustment is calculated for the subject image from the exposure time data and the color spectrum model.

18 Claims, 9 Drawing Sheets

OTHER PUBLICATIONS

Rand, G-et al.; "Working Within Exposure Limits in Digital Photography"; Brooks Institude of Photography; www.sekonic,com/news/review2asp; 2001, 4 pages.

Mayes, JE.-et al.; "High Speed Image Capture for Mechanical Analysis"; IP.com/IPCOM000080397D; Prior Art Database; Feb. 27, 2005, 4 pages.

* cited by examiner

CALIBRATING COLOR FOR AN IMAGE

BACKGROUND

The present invention relates to digital imaging, and more specifically to color correction by calibrating color or adjusting color balance, which may also be known as white balance, gray balance or neutral balance.

Because light sources have varying color temperatures, images captured by standard or digital cameras often exhibit a color cast, which causes an image of a subject to appear differently from an image of the subject captured under different lighting. One may adjust the color balance attribute to remove the color casts caused by light sources. Color balance may also be referred to as white balance, gray balance, or neutral balance.

Accurate color rendition is vital in digital imaging, and correct color balance is a key factor in achieving accurate color rendition. Achieving correct color balance is typically accomplished by applying a color temperature profile to a digital image after the image is captured. In cases where the color temperature of the light source is stable over time, this technique often works well. For a group of images taken under a stable light source, the correct color temperature profile need only be determined for the first image in the group, and can then be applied to all the remaining images in the group.

Achieving correct color balance for a group of images becomes more complicated if the color temperature of the light source changes from image to image. In this case, each image must be analyzed individually to determine the correct color temperature profile to apply.

Achieving correct color balance for an image or images illuminated by fluorescent lighting is also complicated. Fluorescent lights change color significantly and continuously at the frequency of the alternating current ("AC") which powers them. For example, fluorescent lights in the United States may change in color at a 60 times per second cycle. Images captured using exposure times shorter than one complete AC cycle may show significant color shifts with respect to each other, and so will require different color temperature profiles for each image to achieve proper white balance. Worse still, if the exposure time is sufficiently short, the images will show a color variation within each image. For example, the top portion of the image will have a different color cast from the middle portion of the image, which will have a different color cast from the bottom portion. In such cases, there is no single color temperature profile which can be applied to the entire image to achieve correct color balance.

SUMMARY OF THE INVENTION

According to one embodiment of the present invention, correcting color in an image is provided by a method for adjusting color balance for an image, that captures a set of calibration images of a calibration target. The calibration target includes a color reference region illuminated by a light source having a distribution of frequencies that cycles over a fixed time period. The calibration images are captured over a calibration period that is greater than or equal to the fixed time period over which the distribution of frequencies repeatedly varies. Each of the calibration images is associated to a time identifier. A color balance adjustment is calculated for each of the calibration images, for forming a time-dependent color spectrum model of the color balance adjustments. The color spectrum model models changes in the light source over the fixed time period.

In one embodiment, a subject image of a subject is captured for a determined exposure time. In the subject image, the subject is illuminated by the light source. Exposure time data is associated to the subject image. At least one subject color balance adjustment is calculated for the subject image from the exposure time data and the color spectrum model.

DETAILED DESCRIPTION

The following is intended to provide a detailed description of an example of the invention and should not be taken to be limiting of the invention itself. Rather, any number of variations or embodiments may fall within the scope of the invention, which is defined in the claims following the description.

Embodiments of the invention model color variation of a light source over time. Certain embodiments use this model to provide automated color balance correction of images. Embodiments of the present invention generate a time-varying color spectrum model. It is from this model that embodiments of the invention calculate a subject color balance adjustment for a subject image.

Figure 1:
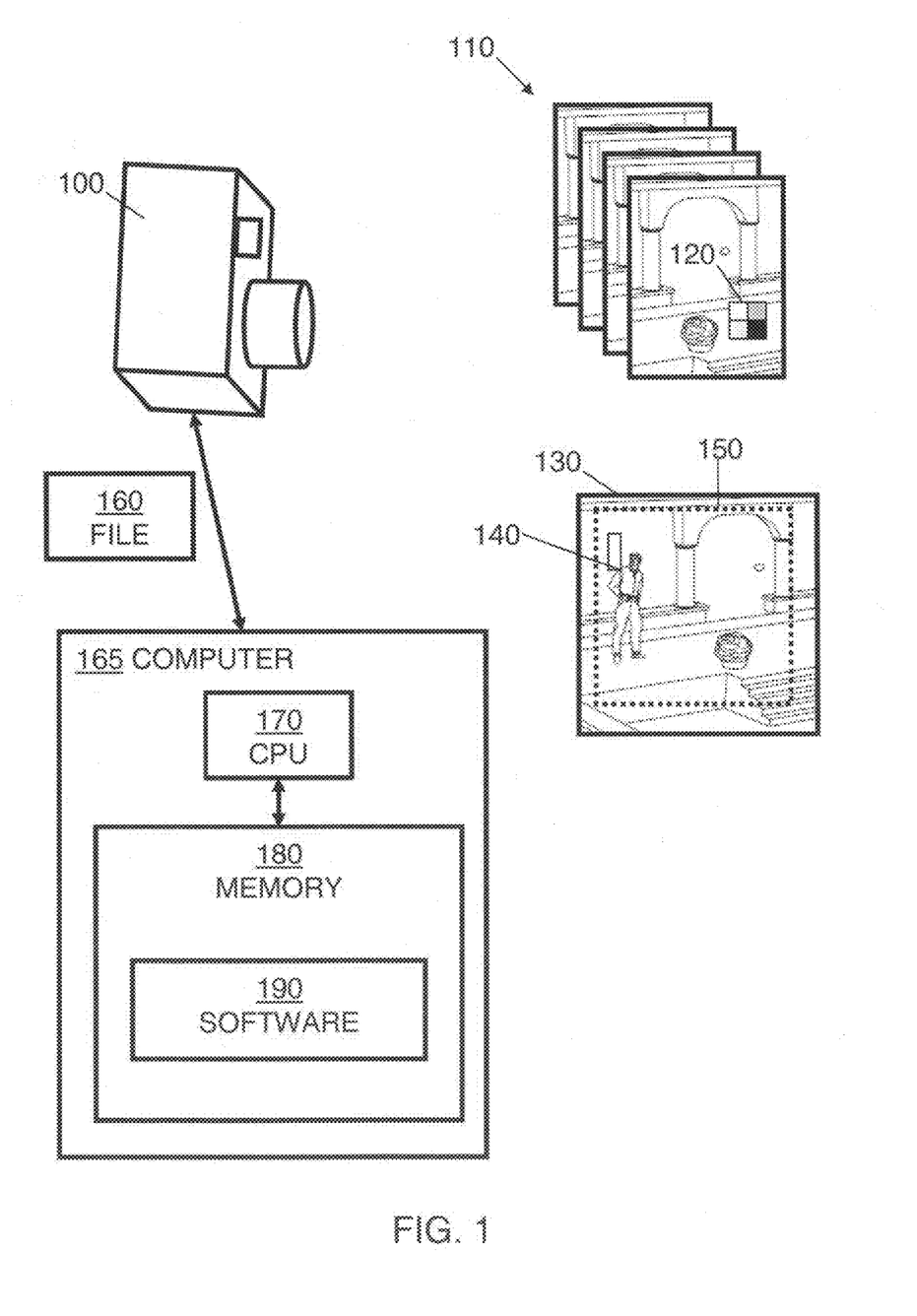
FIG. 1 is a block diagram of one embodiment of the invention, that includes a series of calibration images and a subject image.

FIG. 1 is a block diagram of one embodiment of the invention. A digital capture device 100 may be a digital single-lens-reflex camera ("dSLR"), digital video camera, a cellular phone with an embedded digital camera, an MP3 player with an embedded digital video camera, or other device that is designed to capture digital images. The digital capture device 100 is used to capture a series of calibration images 110 illuminated by a light source. The light source has a distribution of frequencies that cycles over a fixed time period. For example, the light source may be a fluorescent light with a cycle of 60 times per second.

The calibration images 110 include a calibration target 120 that contains a color reference region. The calibration target 120 may be a neutral grey card that is commonly used in digital imaging. The calibration target 120 may also be the calibration product sold by Datacolor under the trademark SPYDERCUBE, the 24-color target product sold by X-Rite under the trademark COLORCHECKER, or various other products sold for color management. In some embodiments, the calibration target 120 may simply be a portion of an image that is relied upon to represent a neutral gray, white, black, or other value.

The series of calibration images 110 are made at short exposure times and in rapid sequence. For example, the exposure time may be 1/4000 second and there may be one exposure every 1/120 second. Of course, other exposure time and sequence timings may be used. The series of calibration images 110 are captured over a calibration period that is greater than or equal to the fixed time period of the light source. Current technology of capture devices 100 may achieve these short exposure times and sequence timings by using a low pixel resolution. For example, one embodiment of the invention may capture calibration images 110 at a low 200 by 200 pixel resolution. Other embodiments may use lower or higher resolutions.

Calibration images 110 are stored electronically as files 160. In some embodiments the files 160 are stored in any of a number of raw file formats, each of which is proprietary to a single camera manufacturer, and each of which is typically specific to a given make and model of camera. Such proprietary file formats are referred to here as "RAW" files. In other embodiments, the files 160 are stored as JPG format files. Other file format types may also be used. When each calibration image 110 is made, a time identifier is associated to the calibration image 110. In some embodiments, the time identifier is stored as part of file 160. For example, the time identifier may be stored as part of the RAW or JPG file. In other embodiments of the invention, the time identifier may be stored separately from the files 160.

From the calibration images 110 and associated time identifiers, various embodiments of the invention create the time-varying color spectrum model. For each calibration image 110, an embodiment of the invention uses the color reference region of the calibration target in the image and applies a color-balance technique. Such color-balance techniques are well known in the art. For example, in one embodiment, the color reference region includes a neutral gray and the invention determines the color balance adjustment value for the image. Such a color balance adjustment is the color temperature needed to map the actual color values for red, green, and blue in the calibration image to a neutral grey where the red value, the green value, and the blue value are all three equal to 128 on a scale of 0 to 255. The color balance adjustment may be expressed in kelvins.

Because a time identifier is associated with each of the calibration images 110, the color balance adjustments for the images may be associated with the time identifiers. For example, a series of 64 calibration images 110 may result in the following data:

| Time (seconds) | Color Temperature (kelvins) |
|---|---|
| 0.00 | 5200 |
| 0.02 | 5357 |
| 0.03 | 5512 |
| 0.05 | 5663 |
| 0.07 | 5810 |
| 0.08 | 5950 |
| 0.10 | 6081 |
| 0.12 | 6203 |
| 0.13 | 6314 |
| 0.15 | 6413 |
| 0.17 | 6499 |
| 0.18 | 6570 |
| 0.20 | 6626 |
| 0.22 | 6667 |
| 0.23 | 6692 |
| 0.25 | 6700 |
| 0.27 | 6692 |
| 0.28 | 6668 |
| 0.30 | 6627 |
| 0.32 | 6571 |

-continued

| Time (seconds) | Color Temperature (kelvins) |
|---|---|
| 0.33 | 6500 |
| 0.35 | 6415 |
| 0.37 | 6316 |
| 0.38 | 6205 |
| 0.40 | 6083 |
| 0.42 | 5952 |
| 0.43 | 5812 |
| 0.45 | 5666 |
| 0.47 | 5514 |
| 0.48 | 5359 |
| 0.50 | 5202 |
| 0.52 | 5046 |
| 0.53 | 4891 |
| 0.55 | 4739 |
| 0.57 | 4592 |
| 0.58 | 4452 |
| 0.60 | 4321 |
| 0.62 | 4198 |
| 0.63 | 4087 |
| 0.65 | 3988 |
| 0.67 | 3903 |
| 0.68 | 3831 |
| 0.70 | 3774 |
| 0.72 | 3733 |
| 0.73 | 3709 |
| 0.75 | 3700 |
| 0.77 | 3708 |
| 0.78 | 3732 |
| 0.80 | 3772 |
| 0.82 | 3828 |
| 0.83 | 3899 |
| 0.85 | 3984 |
| 0.87 | 4083 |
| 0.88 | 4193 |
| 0.90 | 4315 |
| 0.92 | 4446 |
| 0.93 | 4586 |
| 0.95 | 4732 |
| 0.97 | 4884 |
| 0.98 | 5039 |
| 1.00 | 5200 |
| 1.02 | 5357 |
| 1.03 | 5512 |
| 1.05 | 5663 |

As explained above, the series of calibration images 110 are captured over a calibration period that is greater than or equal to the fixed time period of the light source. In the example from the above data table, if the light source was a fluorescent light with a 60 times per second cycle, the series of 64 calibration images captured over 1.05 seconds exceeds the fixed time period of the light source and provides sufficient sampling for various embodiments of the invention.

Figure 2:
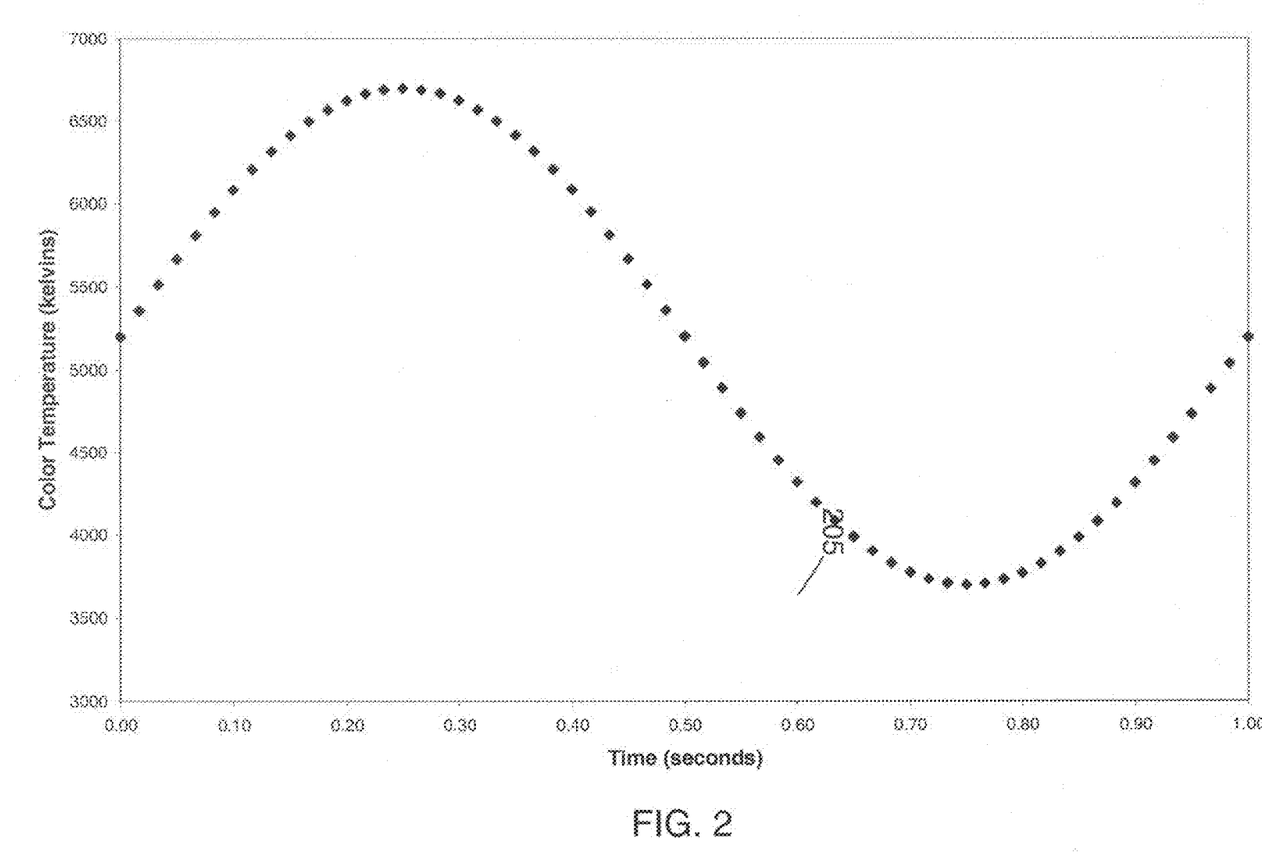
FIG. 2 is a graph plotting color temperature data points for a light source over time.
Figure 3:
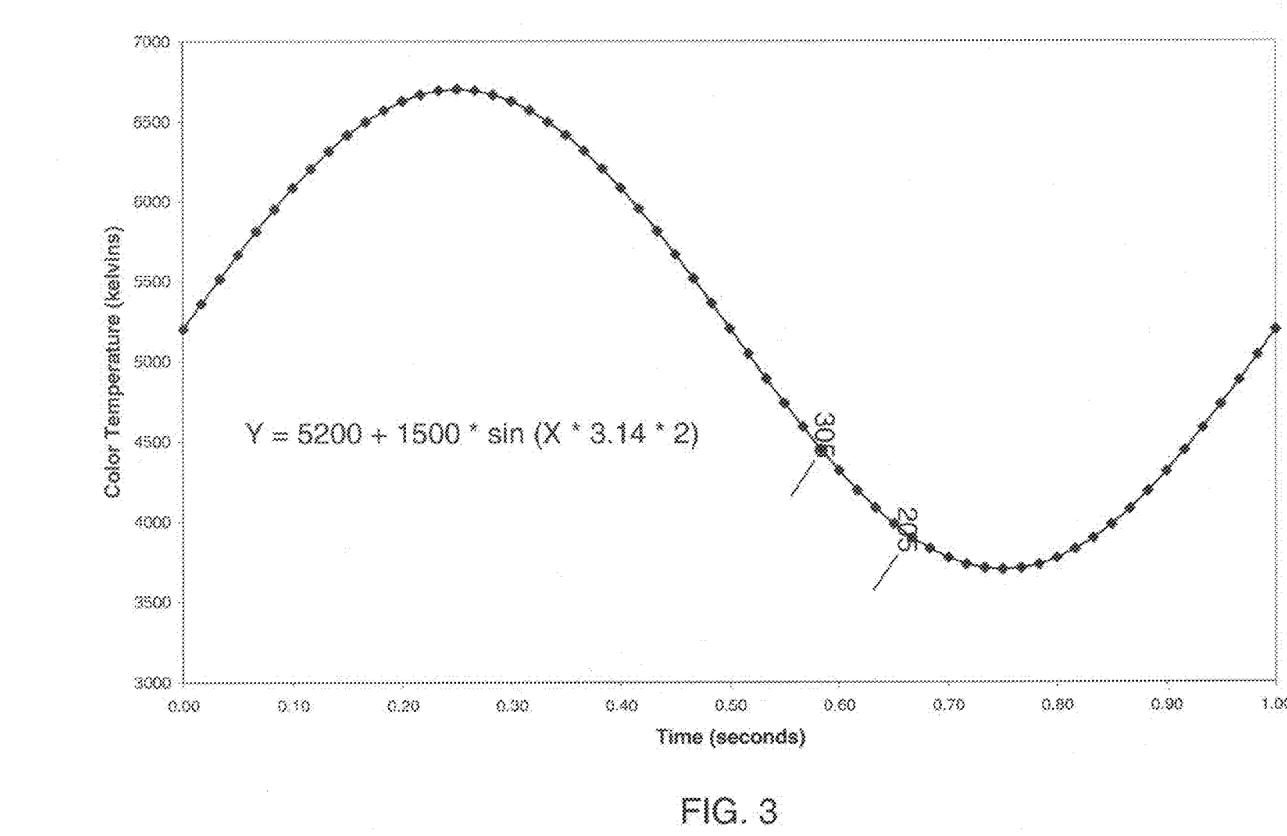
FIG. 3 illustrates a color spectrum model calculated by the graph of FIG. 2.
Figure 4:
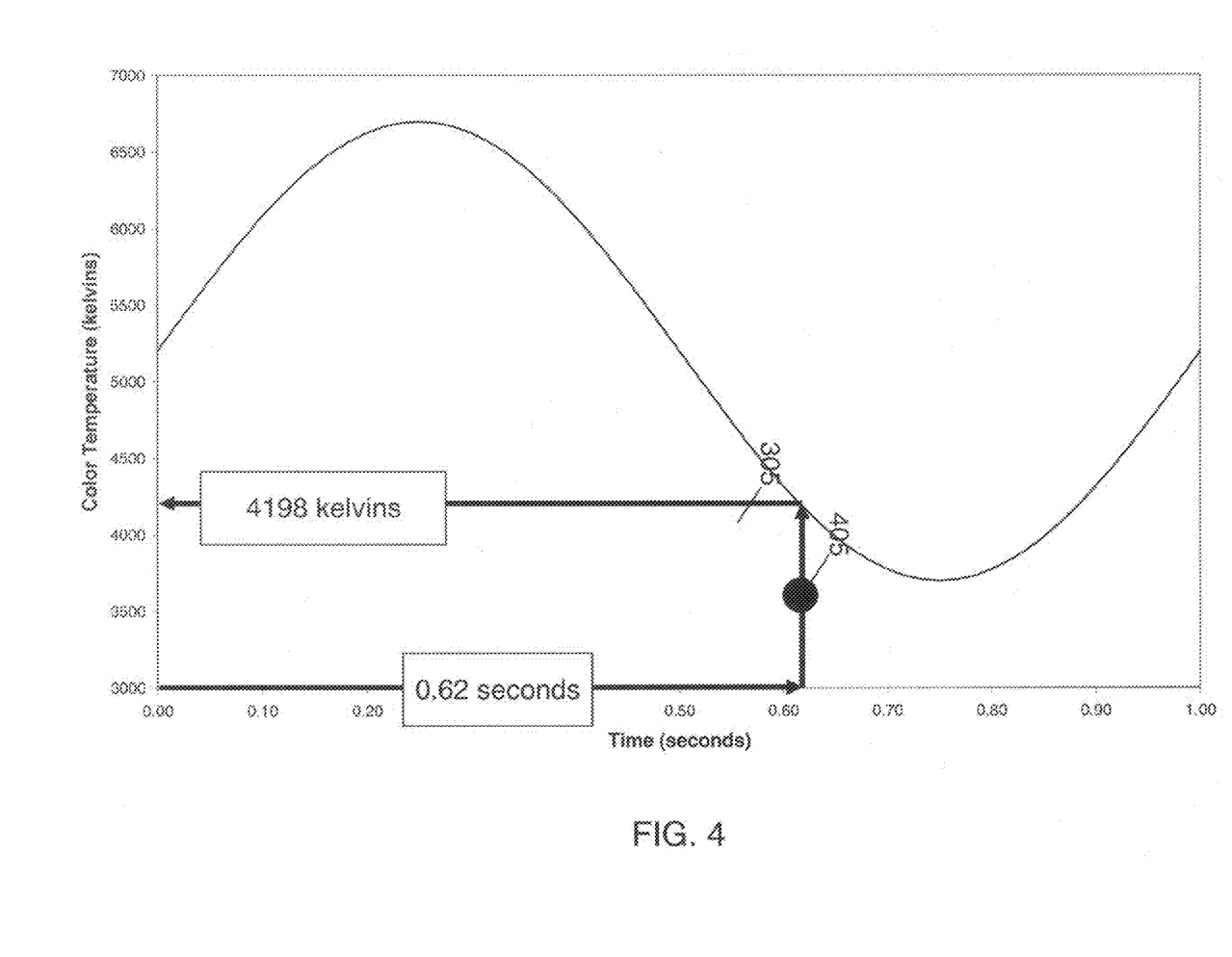
FIG. 4 illustrates a color balance adjustment indicated by the color spectrum model of FIG. 3.

FIG. 2 is a graph plotting color temperature color balance adjustment data points 205 along the Y-axis against the time identifiers on the X-axis, from data points contained in the above data table. In some embodiments, the invention determines a function 305 that describes the collected data points. Such a function is shown in FIG. 3, and is a analytic representation of the time-varying color spectrum model of the invention. This spectrum model comprehends how the color temperature of the light source varies over time during its entire fixed period time cycle. The information in the model is absolute with respect to time. Thus, the model can output what the color temperature of the light source was at any point in time during the session when the images were captured. For example, FIG. 4 illustrates a color balance adjustment indicated by the color spectrum model of FIG. 3. As FIG. 4 indicates, at 0.62 seconds, the color balance adjustment value 405 is 4198 kelvins. Thus, the model can provide information for appropriate color correction at any time during the interval in which the calibration images were captured. In addition, the model can also provide information for appropriate color correction at times after (or before) the interval in which the calibration images were captured. The invention provides the ability to extrapolate from the information captured during the calibration interval, to correct images taken before or after the calibration interval. For example, if the series of calibration images is captured between 12:45:15 and 12:45:17; the model may also be used to color-correct images taken from 12:50 through 13:50. This is possible because of the repeating cyclic nature of the variation of the light source.

FIGS. 2 through 4 are only explanatory. Embodiments of the present invention do not generate such actual graphs. Rather, the calibration images 110 that are stored electronically as files 160 are processed by software 190 in a memory 180 of a computer 165 that has a CPU 170 and the time-varying color spectrum model is generated and stored as a data structure or otherwise in memory 180. In some embodiments, computer 165 is separate from the capture device 100. Such a computer 165 may be a local personal computer by which the capture device can be directly connected. Or such a computer 165 may be a remote computer that is accessed over the Internet or other network. In yet other embodiments, computer 165 may be within the capture device 100 itself.

Thus far, embodiments of the present invention that use calibration images 110 to generate a spectrum model have been explained. Some embodiments of the invention leverage an existing spectrum model to color-correct images. Returning now to FIG. 1, the capture device 100 is used to capture a subject image 150 of a subject 130. The subject image 150 is illuminated by the same light source that illuminated the calibration images 110. As with the calibration images 110, the subject image 150 is stored electronically as a file 160. In some embodiments the file 160 is a RAW file, a JPG file, or other file type. When the subject image 150 is made, exposure time data is associated to the subject image 150. In some embodiments, the exposure time data is stored as part of file 160. For example, the exposure time data may be stored as part of the RAW or JPG file. In other embodiments of the invention, the exposure time data may be stored separately from the file 160. Capture device 100 may capture a series of subject images 150, although for simplicity, only one subject image 150 is shown in FIG. 1.

Figure 5A:
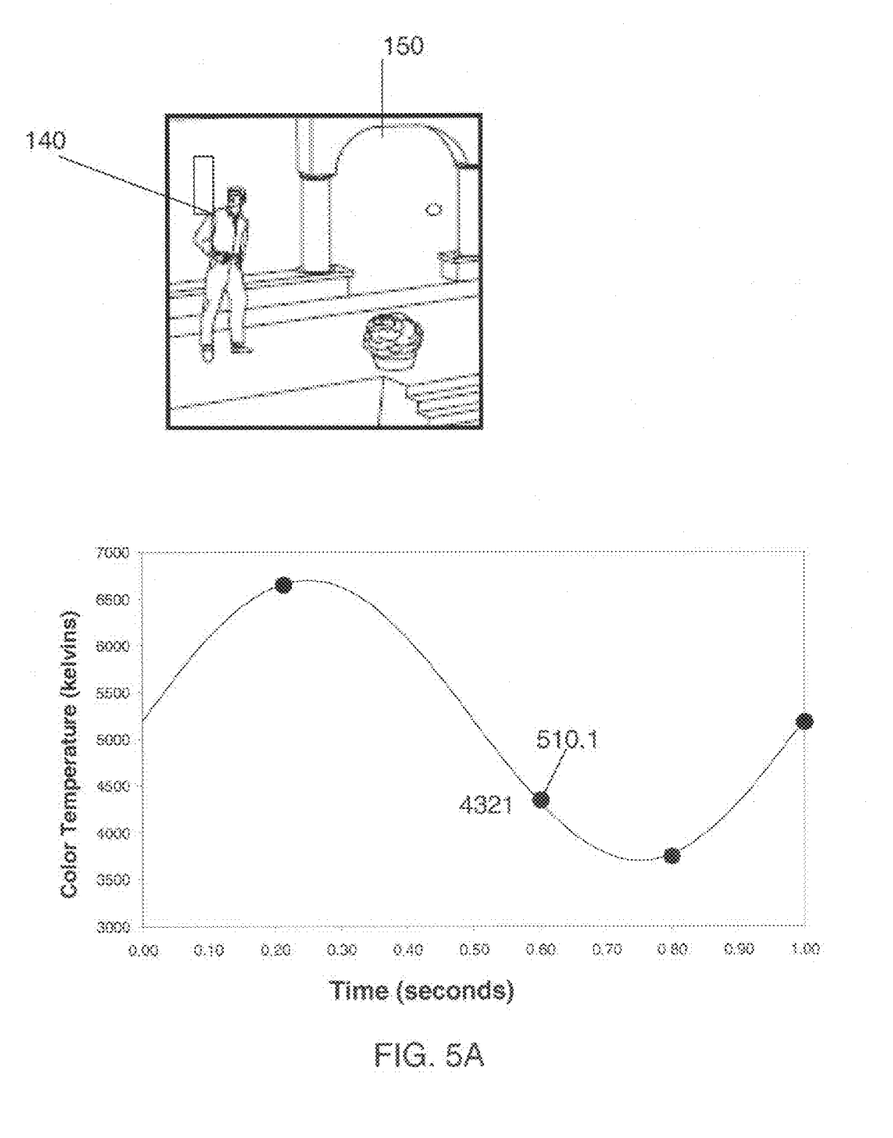
FIG. 5A illustrates calculating a color balance adjustment for the subject image.

FIG. 5A illustrates how certain embodiments of the invention calculate a color balance adjustment for the subject image 150 based on the exposure time data associated with the subject image 150. In the example shown in FIG. 5A, the exposure time data correlates to time 0.62 from the model. Thus, the color balance adjustment 510.1 is 4321 kelvins. Leveraging the color spectrum model, embodiments of the present invention may correct the color balance in a series of subject images automatically.

Embodiments of the invention may also uses the exposure time information in the image file 160 (often embedded as metadata) to make a decision on what type of color balance correction is needed for the image. For a subject image 150 receiving the same integrated light exposure, the image may require only a single color balance correction applied to the entire image file 160. Using FIG. 5A as an example of this, a 4321 kelvin color balance may be applied to all of the pixels of the image file 160.

Figure 5B:
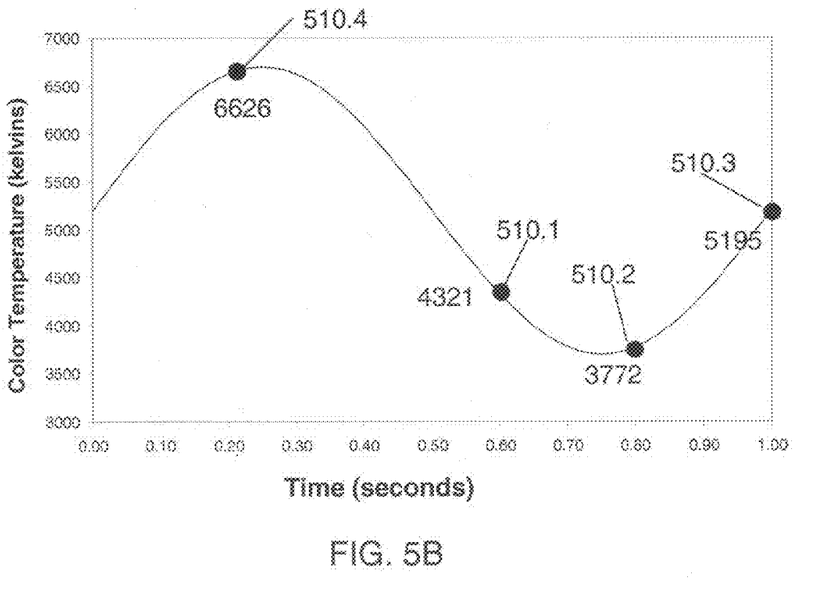
FIG. 5B illustrates calculating a series of color balance adjustments for the subject image, in which adjustments are applied to horizontal regions.

However, for images where the exposure time is short compared to fixed time period of the light source's cycle, the subject image 150 will show a color cast which varies in regions of the image. FIG. 5B illustrates how an embodiment of the invention may determine that the subject image may be treated as having four horizontal regions 520.1 through 520.4.

Figure 5C:
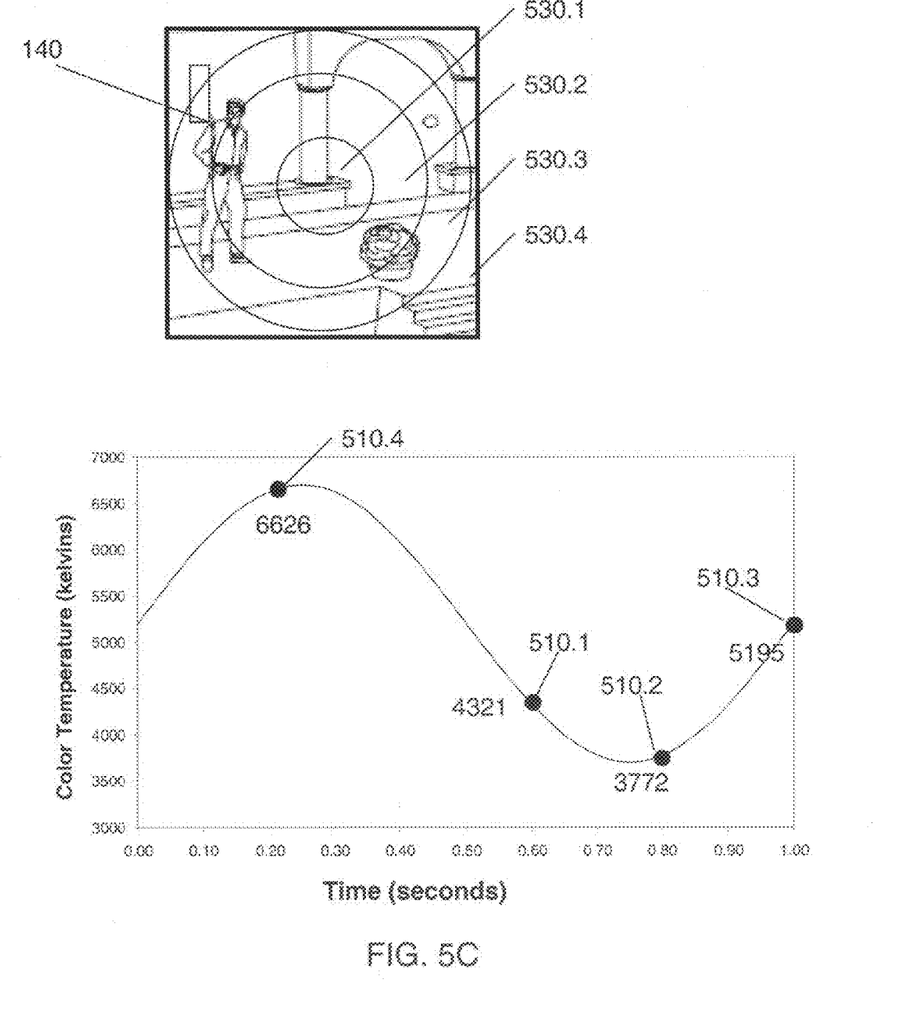
FIG. 5C illustrates calculating a series of color balance adjustments for the subject image, in which adjustments are applied to radial regions.

Embodiments of the invention may calculate that a first color balance adjustment of 4321 kelvins be applied to the first horizontal region 520.1, a second color balance adjustment of 3772 kelvins be applied to the second horizontal region 520.2, a third color balance adjustment of 5195 kelvins be applied to the third horizontal region 520.3, and a fourth color balance adjustment of 6626 kelvins be applied to the fourth horizontal region 520.4. Such horizontal bands in a subject image may occur because certain dSLRs use a narrow slit moving at high speed across the surface of the imaging sensor to control exposure time. For such images, embodiments of the invention use its color spectrum model to create an appropriate color temperature gradient, and apply that gradient to the image file. Other embodiments of the invention may support vertical regions within the subject image. FIG. 5C shows radial regions 530.1, 530.2, 530.3 and 530.4 that certain embodiments may support for capture devices 110 that have a radially-opening shutter.

Figure 6A:
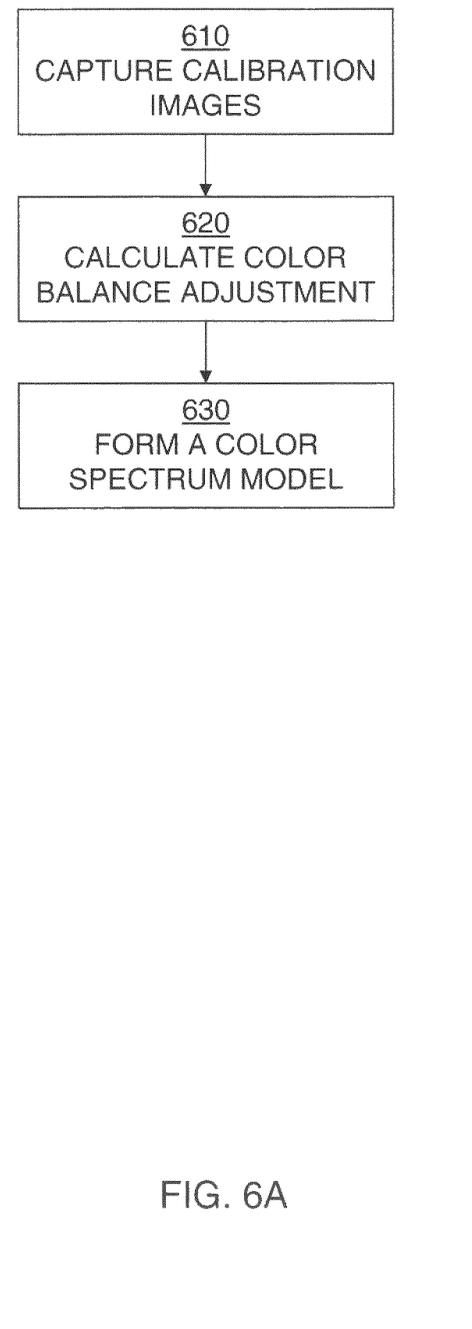
FIGS. 6A and 6B are flowcharts of exemplary steps of an embodiment of the invention.
Figure 6B:
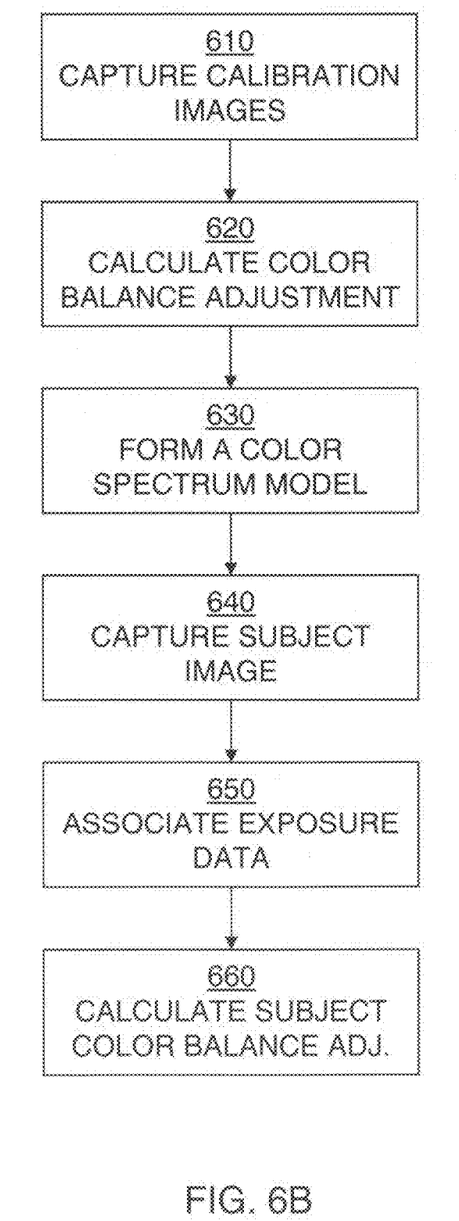

FIGS. 6A and 6B are flowcharts of exemplary steps of an embodiment of the invention. In FIG. 6A, a first step 610 of an embodiment of the invention involves capturing a series of calibration images 110 of a calibration target 120 having a color reference region that is illuminated by a light source having a distribution of frequencies that cycles over a fixed time period. Such calibration images 110 are captured over a calibration period that is greater than or equal to the fixed time period. Each calibration image 110 is associated to a time identifier.

In the second step 620, the embodiment of the invention calculates a color balance adjustment for each of the calibration images 110 and from these adjustments, at step 630 form a color spectrum model of the color balance adjustments. The color spectrum model models the changes in the light source over its fixed time period.

FIG. 6B illustrates a flowchart of another embodiment of the invention in which after step 630, at step 640 one or more subject images 150 (that are illuminated by the light source that illuminated the calibration target 120) are captured for a determined exposure time. At step 650 exposure time data is associated to the subject image 150. At step 660, one or more subject color balance adjustments are calculated for the subject image 150 from the color spectrum model.

The embodiments of the invention so far discussed are used to correct color balance in an image that was illuminated by light source(s) that are assumed to emit frequencies that are distributed as would be expected from an ideal black-body object heated to a given temperature, per the common definition of color temperature.

As a result, FIG. 2 shows that a single data point (i.e., the color temperature of the light source(s)) can be plotted for a particular point in time. One skilled in the art will recognize that the invention can be extended to provide a collection of color calibration profiles, in which a color calibration profile (rather than a color temperature) can be associated with each point in time.

Such an embodiment is used when the light source(s) do not emit a distribution of frequencies which is well described by a single color temperature. One skilled in the art will recognize that light sources can have spectra which differ from that which is well described by a single color temperature.

The previous discussion described that a single color balance adjustment may be generated by analyzing a color reference region that is known to be neutral gray. By extension, a plurality of color adjustments making up a color calibration profile may be generated by analyzing more than one known color reference region. For example, the target product sold by X-Rite under the trademark COLORCHECKER includes 24 color reference areas. For simplicity of discussion here, one color reference region may be a neutral gray, a second color reference region may be red, a third color reference region may be green, a fourth color reference region may be blue, a fifth color reference region may be orange, a sixth color reference region may be yellow, and so on. The white balance color correction determined by analysis of a single neutral gray target can be expanded to an analysis of a collection of differently colored regions from the color reference target to permit creation of a color spectrum model which is not a single number for color temperature (with its underlying assumptions about distribution of frequencies) but is a color calibration profile, which contains within it information about the actual distribution of frequencies for the light source being modeled.

As one example, such an embodiment of the invention is useful when images are taken in which the illumination is provided by high-intensity mercury lamps. Such mercury lamps do not exhibit a distribution of frequencies which is accurately described by a single color temperature. By generating a set of color calibration profiles, images may be adjusted so that the appearance of red, green, blue, orange, yellow, and so on in the image matches the various known color reference regions.

The flowcharts of FIGS. 6A and 6B demonstrate how embodiments of the invention can be methods. The invention may also be embodied as a system. In such a system, software 190 in memory 180 of computer 165 includes a color balance adjustor module, an exposure module, a time association module, and a calculator module. Yet other embodiments of the invention are computer program products of computer readable storage medium having computer readable program code. One skilled in the art will understand from the above description and the Figures how the invention may be embodied as a method, a system, and a computer program product.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, any suitable combination of the foregoing, or a future developed computer readable storage medium. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The connection may be physical or wireless.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for adjusting color balance for an image, comprising:
   capturing a plurality of calibration images of a calibration target, wherein the calibration target includes a color reference region illuminated by a light source having a distribution of frequencies that cycles over a fixed time period, wherein the calibration images are captured over a calibration period that is greater than or equal to the fixed time period, wherein each of the plurality of calibration images is associated to a time identifier, wherein the capturing includes capturing for a determined exposure time a subject image of a subject illuminated by the light source;
   associating exposure time data to the subject image; and
   calculating a color balance adjustment for the plurality of calibration images, for forming a time-dependent color spectrum model of the color balance adjustments, wherein the color spectrum model models changes in the light source over the fixed time period, and wherein the calculating includes calculating at least one subject color balance adjustment for the subject image from the exposure time data and the color spectrum model.

2. The method from claim 1, wherein the color reference region is a neutral color region and wherein the color balance adjustment is a white balance adjustment.

3. The method from claim 1, wherein the at least one subject color balance adjustment is calculated for at least one horizontal region in the subject image.

4. The method from claim 1, wherein the at least one subject color balance adjustment is calculated for at least one radial region in the subject image.

5. The method from claim 1, wherein the color reference region is a plurality of color reference regions, and
   wherein calculating a color balance adjustment comprises calculating a color calibration profile that is derived from the plurality of color reference regions.

6. A system for adjusting color balance for an image, comprising:
   a capture device that captures a plurality of calibration images of a calibration target, wherein the calibration target includes a color reference region illuminated by a light source having a distribution of frequencies that cycles over a fixed time period, wherein the calibration images are captured over a calibration period that is greater than or equal to the fixed time period, wherein each of the plurality of calibration images is associated to a time identifier, wherein the capture device captures for a determined exposure time a subject image of a subject illuminated by the light source and wherein exposure time data is associated to the subject image; and
   a color balance adjuster that calculates a color balance adjustment for the plurality of calibration images, for forming a time-dependent color spectrum model of the color balance adjustments, wherein the color spectrum model models changes in the light source over the fixed time period, and wherein the color balance adjuster calculates at least one subject color balance adjustment for the subject image from the exposure time data and the color spectrum model.

7. The system from claim 6, wherein the color reference region is a neutral color region and wherein the color balance adjustment is a white balance adjustment.

8. The system from claim 6, wherein the at least one subject color balance adjustment is calculated for at least one horizontal region in the subject image.

9. The system from claim 6, wherein the at least one subject color balance adjustment is calculated for at least one radial region in the subject image.

10. The system from claim 6, wherein the color reference region is a plurality of color reference regions, and
    wherein the color balance adjuster calculates a color calibration profile that is derived from the plurality of color reference regions.

11. A computer program product for adjusting color balance for an image, the computer program product comprising:
    non-transitory computer readable storage medium having computer readable program code embodied therewith, the computer readable program code comprising:
    computer readable program code configured to capture a plurality of calibration images of a calibration target, wherein the calibration target includes a color reference region illuminated by a light source having a distribution of frequencies that cycles over a fixed time period, wherein the calibration images are captured over a calibration period that is greater than or equal to the fixed time period, wherein each of the plurality of calibration images is associated to a time identifier; and computer readable program code configured to capture for a determined exposure time a subject image of a subject illuminated by the light source;

computer readable program code configured to associate exposure time data to the subject image;

computer readable program code configured to calculate a color balance adjustment for the plurality of calibration images, for forming a time-dependent color spectrum model of the color balance adjustments, wherein the color spectrum model models changes in the light source over the fixed time period; and computer readable program code configured to calculate at least one subject color balance adjustment for the subject image from the exposure time data and the color spectrum model.

12. The computer program product from claim 11, wherein the color reference region is a neutral color region and wherein the color balance adjustment is a white balance adjustment.

13. The computer program product from claim 11, wherein the at least one subject color balance adjustment is calculated for at least one horizontal region in the subject image.

14. The computer program product from claim 11, wherein the at least one subject color balance adjustment is calculated for at least one radial region in the subject image.

15. The computer program product from claim 11, wherein the color reference region is a plurality of color reference regions, and wherein the computer readable program code configured to calculate a color balance adjustment calculates a color calibration profile that is derived from the plurality of color reference regions.

16. A method for calibrating color for an image, comprising:

capturing a plurality of calibration images of a calibration target, wherein the calibration target includes a plurality of color reference regions illuminated by a light source having a distribution of frequencies that cycles over a fixed time period, wherein the calibration images are captured over a calibration period that is greater than or equal to the fixed time period, wherein each of the plurality of calibration images is associated to a time identifier, wherein the capturing includes capturing for a determined exposure time a subject image of a subject illuminated by the light source;

associating exposure time data to the subject image;

forming a time-dependent color spectrum model that is derived from the plurality of color reference regions captured in the plurality of calibration images, wherein the color spectrum model models changes in the light source over the fixed time period; and calculating a plurality of subject color adjustments for the subject image from the exposure time data and the color spectrum model.

17. The method from claim 16, wherein the plurality of subject color adjustments are calculated for at least one horizontal region in the subject image.

18. The method from claim 16, wherein the plurality of subject color adjustments are calculated for at least one radial region in the subject image.

* * * * *